US008786972B2

(12) United States Patent
Grobis et al.

(10) Patent No.: US 8,786,972 B2
(45) Date of Patent: Jul. 22, 2014

(54) MAGNETIC RECORDING DISK DRIVE WITH METHOD FOR RECOVERY OF DATA FROM FAILED DATA SECTORS

(71) Applicant: HGST Netherlands B.V., Amsterdam (NL)

(72) Inventors: Michael Konrad Grobis, San Jose, CA (US); Kurt Allan Rubin, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/680,087

(22) Filed: Nov. 18, 2012

(65) Prior Publication Data
US 2014/0139942 A1 May 22, 2014

(51) Int. Cl.
G11B 5/02 (2006.01)
G11C 29/00 (2006.01)
(52) U.S. Cl.
USPC .......................................... 360/53; 714/718
(58) Field of Classification Search
None
See application file for complete search history.

(56) References Cited

U.S. PATENT DOCUMENTS

| 7,835,099 | B2 | 11/2010 | Mallary et al. | |
| 7,852,717 | B2 | 12/2010 | Albrecht et al. | |
| 7,900,100 | B2 | 3/2011 | Gollub | |
| 8,477,569 | B2 * | 7/2013 | Erden et al. | 369/13.01 |
| 2007/0273995 | A1 * | 11/2007 | Unoki et al. | 360/39 |
| 2010/0017684 | A1 | 1/2010 | Yang | |
| 2013/0308433 | A1 * | 11/2013 | Yulizar et al. | 369/53.41 |

* cited by examiner

Primary Examiner — Regina N Holder
(74) Attorney, Agent, or Firm — Thomas R. Berthold

(57) ABSTRACT

A magnetic recording disk drive determines the locations of defective bits in a failed data sector, and allows for the error correction code (ECC) to correctly decode the data from the sector. After a sector has failed decoding, the digitized waveform and the read channel state from the failed sector are stored in memory. A nondata pattern is written to the failed sector and read back to determine the locations of the defective data bits in the failed sector, which are then used to update the read channel state. The data pattern from the failed sector, with the identified bit error locations, is attempted to be decoded. If the decoding is successful then the sector is marked as bad and the correctly decoded data pattern is written to a different region of the disk, for example physical sectors specifically intended for use as spare sectors.

16 Claims, 6 Drawing Sheets

| Bit # | DWV | P(0) | P(1) | Bit Value (Best Guess) |
|---|---|---|---|---|
| $n$-1 | 120 | 0.3 | 0.7 | 1 |
| $n$ | 25 | 0.9 | 0.1 | 0 |
| $n$+1 | 60 | 0.2 | 0.8 | 1 |

MAGNETIC RECORDING DISK DRIVE WITH METHOD FOR RECOVERY OF DATA FROM FAILED DATA SECTORS

BACKGROUND OF THE INVENTION

1. Field of the Invention

This invention relates generally to magnetic recording disk drives, including disk drives with bit-patterned-media (BPM) where each data bit is stored in a magnetically isolated data island, and more particularly to a disk drive that can recover written data from data sectors that have hard bit errors, such as defective data islands in BPM.

2. Description of the Related Art

Magnetic recording hard disk drives with bit-patterned-media (BPM) have been proposed to increase the data density. In BPM, the magnetic material on the disk is patterned into small isolated data islands arranged in concentric data tracks. Each island contains a single magnetic "bit" and is separated from neighboring islands by a nonmagnetic region. This is in contrast to conventional continuous-media wherein a single "bit" is composed of multiple weakly-coupled neighboring magnetic grains that form a single magnetic domain and the bits are physically adjacent to one another. The data islands in the tracks are grouped into data sectors.

The writing of data to the data islands in the data sectors also includes the writing of parity bits or error correction bits. The use of an error correction code (ECC) in disk drives is well-known and involves writing parity bits or error correction bits at the ends of data sectors or data tracks, where the parity bits or error correction bits are computed from the data to be written, using an algorithm, like one of the well known ECC algorithms. When the data is read back from a sector the ECC detects errors and uses the error correction bits to correct the errors. Examples of error correction codes used in magnetic recording disk drives include block codes such as Reed-Solomon (RS) codes and convolutional codes such as low-density parity-check (LDPC) codes.

The ECC can successively decode the written data provided the number of incorrect bits falls below some threshold. However, it is well known that the allowed number of bit errors increases if the ECC is provided with pointers to unreliable bits or suspected bad bits. In BPM, defective data islands are a source of unreliable bits. In perpendicular magnetic recording (PMR) and heat assisted magnetic recording (HAMR) on conventional continuous-media, the unreliable bits may arise from defects in the continuous magnetic recording layer, such as asperities or local grain irregularities. In BPM combined with HAMR defective data islands are also a source of unreliable bits. These unreliable sections of media can lead to "hard errors", i.e., errors that cannot be corrected by rereading because the media is improperly magnetized. The hard errors can result in data sector failures, i.e., the inability to correctly read back the data from the sector. Identifying the unreliable bits can allow the sector to be decoded properly. One approach to identifying defective data islands is to map the entire disk, typically during manufacturing or disk drive idle time, and catalogue the locations of the defective islands. However, tracking defective data islands in this manner is time and memory-space consuming and is ineffective if defects get created during operation.

What is needed is a disk drive that is able to determine the location of defective bits after a sector failure so that the ECC can decode the data written in the failed sector.

SUMMARY OF THE INVENTION

The invention relates to a disk drive that determines the locations of defective bits in a failed data sector, such as defective data islands in BPM, and allows for the error correction code (ECC) to correctly decode the data from the sector. After a sector has failed decoding, the digitized waveform and the read channel state from the failed sector are stored in memory, such as a buffer region of memory, to be retrieved later. The data sectors in adjacent tracks that are adjacent to the failed sector are optionally read and decoded, and also stored in the buffer. Then a first predetermined non-data pattern is written to the failed sector and read back. A comparison of the readback pattern with the pattern intended to be written reveals locations of the defective bits in the failed sector. If the number of bit errors exceeds a threshold (E_max) which the ECC is not capable of handling, the sector is marked as failed and the drive informs the customer of the unrecoverable error. One or more additional different predetermined data patterns can be written and read back before concluding that the number of bit errors exceeds E_max. However, if the number of bit errors is below E_max, then the identified error locations are used to update the read channel state. The original read channel state from the failed sector is recalled from the buffer and the bits at the identified error locations are marked as unreliable bits, for example, defective data islands in BPM, that could be hard bit errors in the failed sector. An attempt is made to decode the data pattern from the failed sector with the identified unreliable bit locations. If the decoding is successful then the sector is marked as bad and the correctly decoded data pattern is written to a different region of the disk, for example physical sectors specifically intended for use as spare sectors. If the data in sectors in tracks adjacent to the failed sector were also stored in the buffer, then this data is rewritten back to the disk.

For a fuller understanding of the nature and advantages of the present invention, reference should be made to the following detailed description taken together with the accompanying figures.

DETAILED DESCRIPTION OF THE INVENTION

Figure 1:
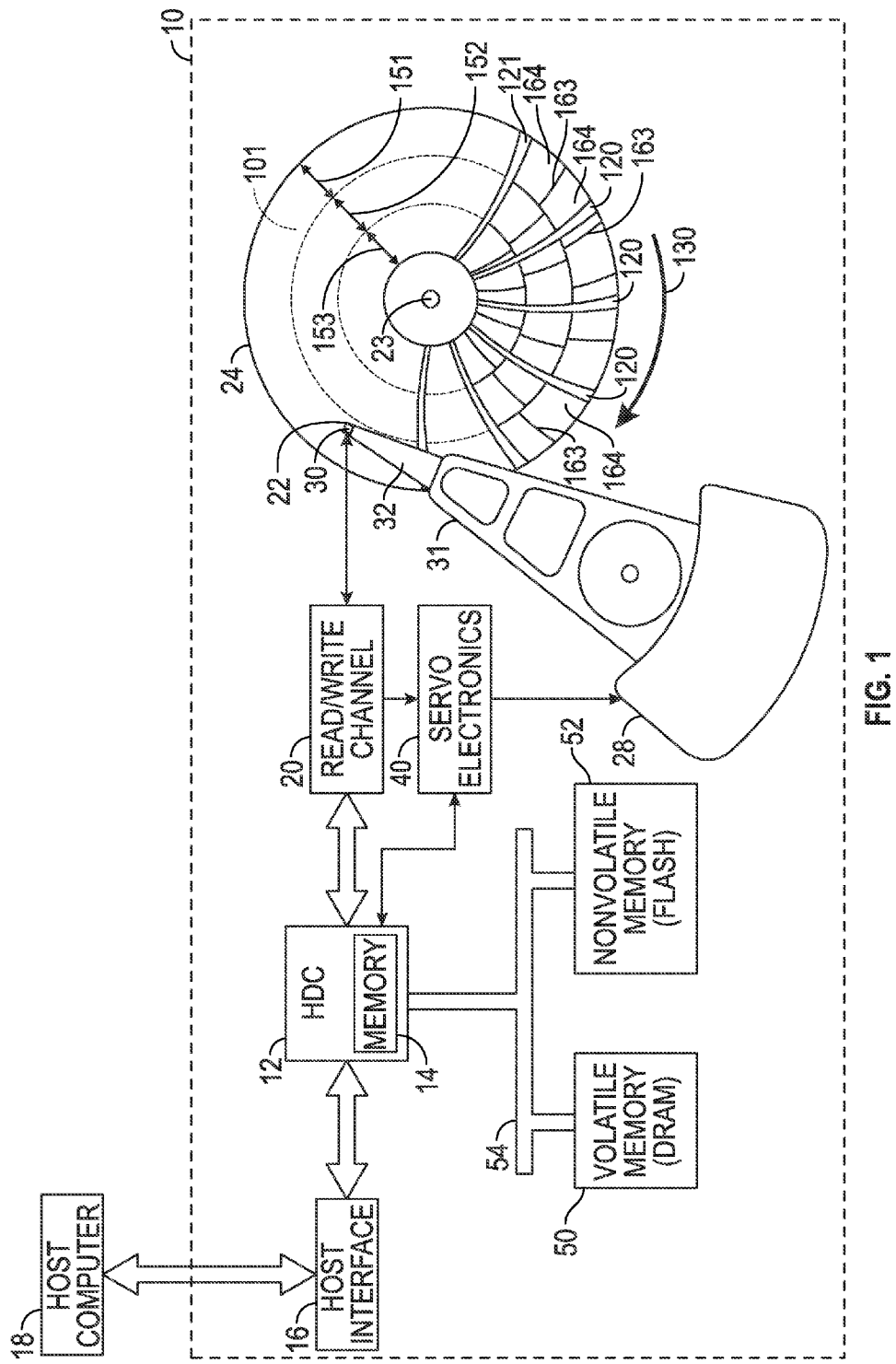
FIG. 1 is a block diagram of a patterned-media magnetic recording disk drive (HDD) operable with the method according to this invention.

FIG. 1 is a block diagram of a patterned-media magnetic recording disk drive (HDD) 10 operable with the method according to this invention. The HDD 10 includes a hard disk controller (HDC) 12 that can include and/or be implemented by a microcontroller or microprocessor. The controller 12 runs a computer program that is stored in semiconductor memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SAS (Serial Attached SCSI).

While the top view of FIG. 1 shows only a single disk 24 and associated read/write head 22, the HDD 10 typically includes a stack of disks that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary voce coil motor (VCM) actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 is a bit-patterned-media (BPM) disk with discrete magnetizable data islands arranged in radially-spaced concentric data tracks, one of which is shown as track 101. Each data track has a reference index 121 indicating the start-of-track. The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone 151. Each data sector 164 contains discrete magnetizable data islands. Each data sector is preceded by a synchronization (sync) field, such as typical sync fields 163. The sync fields 163 are detectable by the read head for enabling synchronization of reading and writing the data bits in the discrete data islands in the data sectors 164.

Each data track also includes a plurality of angularly-spaced servo sectors 120 that contain positioning information detectable by the read head for moving the head 22 to desired data tracks and maintaining the head 22 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. Each of the servo sectors 120 in a data track typically contains a servo timing mark (STM) that indicates the start of the servo sector, a track identification (TID) code, and a portion of a pattern of magnetized blocks or high-frequency bursts that form head position error signal (PES) fields. The PES fields are detected by the read head and decoded to provide a PES, which is a measure of how far the head is off track from the track centerline. Typically there are multiple data sectors 164 located between the servo sectors 120. The servo sectors and data sectors may also contain additional timing marks for synchronizing the write clock to the disk surface's velocity and position past the write head.

The electronics associated with HDD 10 also includes servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the servo information from the servo sectors 120 to run a control algorithm that produces a control signal. The control signal is converted to a current that drives actuator 28 to position the head 22. In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, track and data sector. The numbers are passed to servo electronics 40 to enable positioning head 22 to the appropriate data sector 164. The servo control system enables the head used for reading and writing of bits to be spatially aligned within a fraction of a track-pitch in the radial direction of the disk. The controller 12 has electronics that allow read and write synchronization. Namely the reading and writing of bits can be spatially aligned to within a fraction of a bit cell (e.g., 10%) in the along-the-track, i.e., the circumferential direction of the disk. Such control is essential for BPM recording, but is also needed in the invention to allow for bit tracking.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

The writing of data in the data sectors also includes the writing of parity bits or error correction bits. The use of an error correction code (ECC) in HDDs is well-known and involves writing parity bits or error correction bits associated with the data sectors or data tracks, where the parity bits or error correction bits are computed from the data to be written, using an algorithm, like one of the well known ECC algorithms using Reed-Solomon (RS) and/or low-density-parity-check (LDPC) encoding. The parity bits or error correction bits may be written at the end of a data sector or data track, or convolved into the pattern, or elsewhere on the disk. When the data is read back from a sector the ECC detects and corrects errors by using the error correction bits. Any error-correcting decoding scheme that is consistent with the encoding scheme can be used for error detection. One possible decoding block, shown schematically in FIG. 4A, contains a detector block and an ECC block that pass information back and forth. The decoding block is one part of the read channel. In different blocks of the read channel, the data bits can be grouped into symbols or states, such as 12-bit symbols in a Reed-Solomon ECC decoder or 5-bit intersymbol interference states in a Viterbi detector. For simplicity of discussion, the description relating to ECC will be described for bit states and bit probabilities, rather than symbol or state values and probabilities. However, the method described can easily be generalized to symbols and states.

The ECC can successively decode the written data provided the number of incorrect bits falls below some threshold (e.g., 5-10%). However, it is well known that the allowed number of bit errors increases if the code is provided with pointers to bad bits, suspected bad bits, bad symbols, suspected bad symbols, or suspected bad disk regions. In BPM, as well as for BPM combined with HAMR, defective data islands are a source of "hard" bit errors. Likewise in continuous-media PMR and HAMR, asperities or media irregularities are a source of hard bit errors. Tracking defective data islands or disk sections during operation of a HDD can be time or space consuming.

Figure 2A:
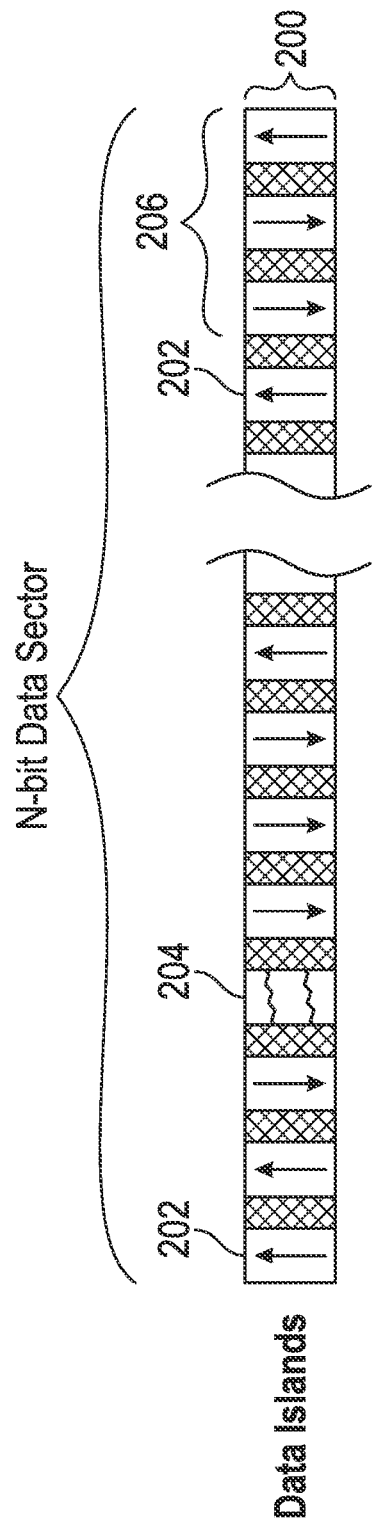
FIG. 2A shows an N-bit data sector with a portion of the disk magnetic recording layer having discrete spaced-apart data islands, each with an up or down magnetization, as indicated by the arrows.
Figure 2A:
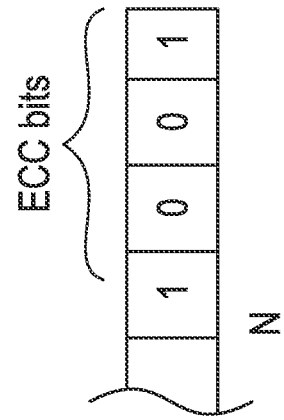
Figure 2B:
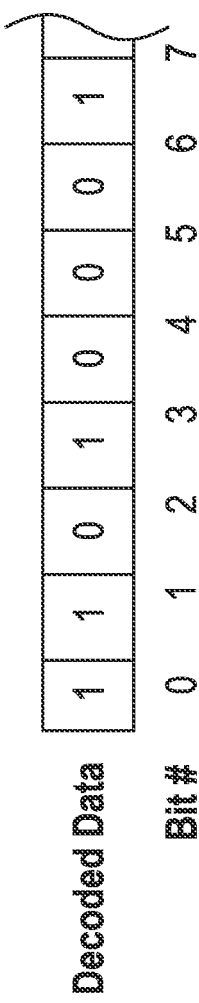
FIG. 2B shows the decoded data for the N-bit data sector from the magnetized data islands in FIG. 2A, where an up magnetization is a 1 and a down magnetization is a 0.

FIG. 2A shows a data sector with a portion of the disk magnetic recording layer 200 having discrete spaced-apart data islands 202, each with an up or down magnetization, as indicated by the arrows. Data island 204 is represented as defective, i.e., unable to be properly magnetized during writing by the write head, but its intended magnetization is a 1. Data island 204 will thus result in a "hard" bit error. Islands 206 are ECC bits located at the end of the data sector. Their magnetization was computed by the ECC from the data to be written in the data sector and they are written when the data bits are written in the data sector. FIG. 2B shows the decoded data for the N-bit data sector from the magnetized data islands in FIG. 2A, where an up magnetization is a 1 and a down magnetization is a 0. Bit #3, corresponding to the defective island 204, is shown as correctly decoded as a 1. However, even though the read head may not have detected the magnetization of island 204, or may have incorrectly detected it as a "down" magnetization, the ECC has correctly decoded this bit using the error correction bits 206. However, if there are also "soft" errors in the data from the read head, for example bit errors caused by a low signal-to-noise ratio, which together with hard errors exceed the capability of the ECC, there will be a sector failure, i.e., an inability to return user data from the sector.

The method of this invention determines the locations of defective data islands in a failed sector, such as the bit #3 location of defective island 204, and thus allows for the ECC to correctly decode the data from the sector. After a sector failure, a specific predetermined nondata pattern is written to the failed sector and read back to determine the location of defective islands. The locations of the defective islands are used as error pointers to the ECC in an attempt to decode the data from the failed sector. The advantage of this invention over defect tracking and cataloging, which is typically done during disk drive manufacturing, is that it does not involve the time and space overhead needed with tracking all defective islands in the disk drive. In addition, islands that become newly defective during operation of the disk drive, after the defects have been cataloged, can also be handled.

Figure 3:
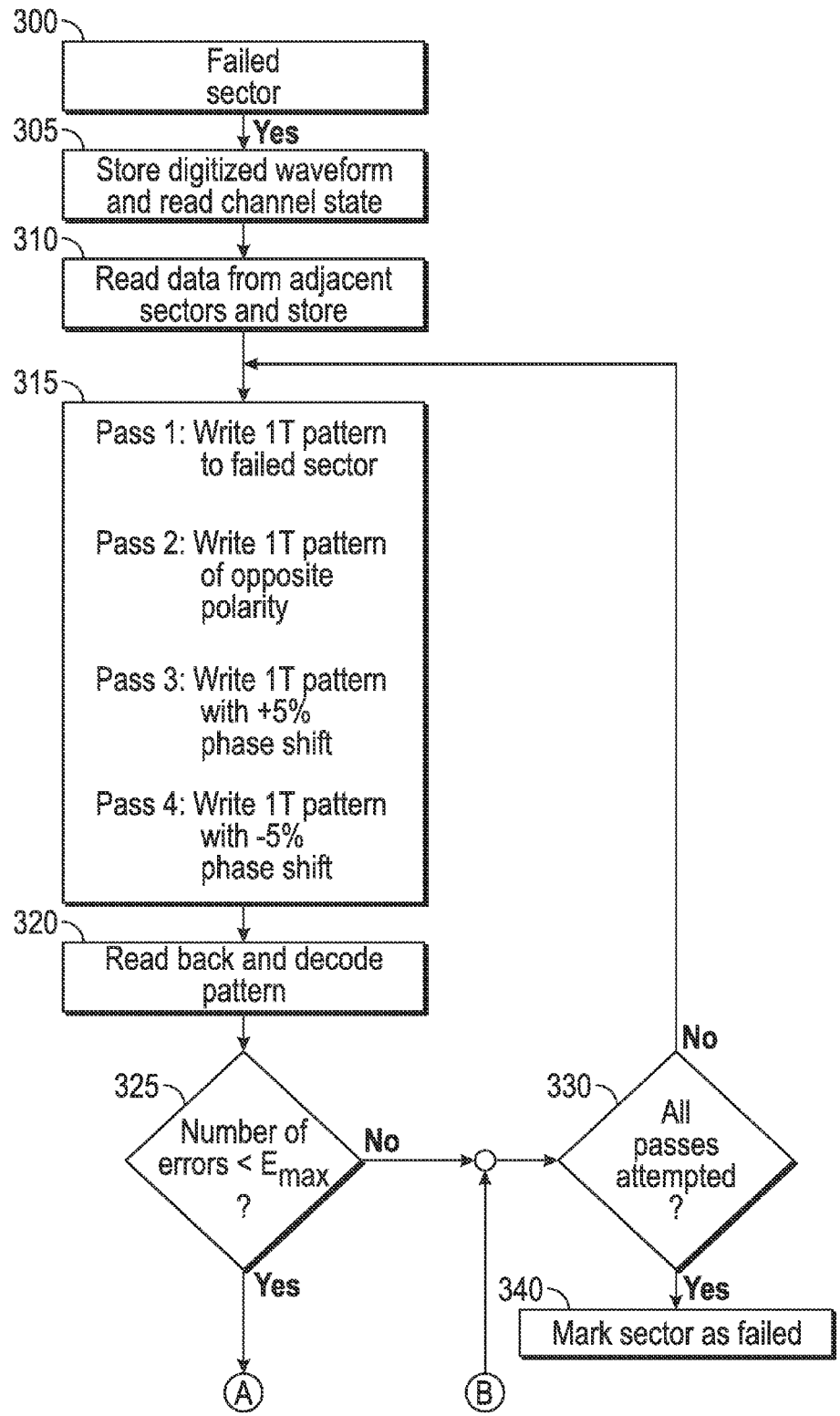
FIG. 3 is a flow chart of the method of the invention.
Figure 3:
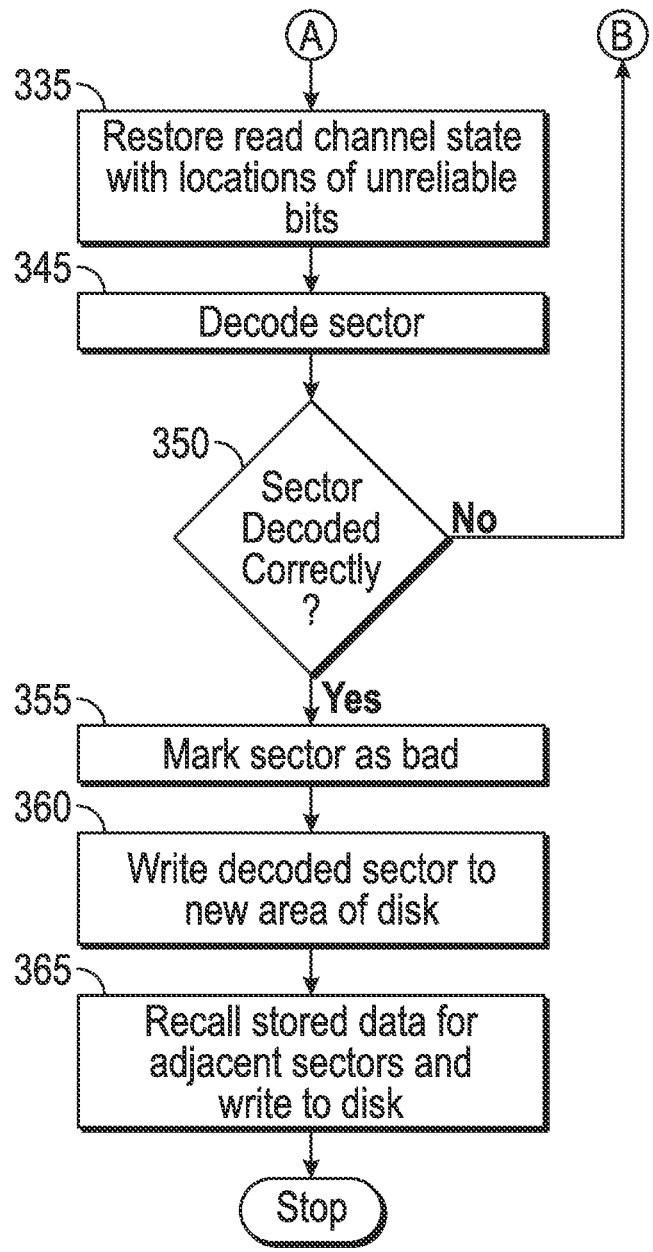

FIG. 3 is a flow chart of the method. The failed sector recovery protocol is enacted immediately after a sector has been deemed unrecoverable through regular means, such as multiple read attempts or recovery using ECC (block 300). After a sector has failed decoding, the digitized waveform and the read channel state are stored in memory, such as a buffer region of memory, to be retrieved later (block 305). The uncorrectable data from the failed sector must match the uncorrectable data stored in the buffer. This verification can be made by reading the failed sector multiple times and averaging, on a bit by bit basis, to get a best estimate of what the uncorrectable data was. By reading multiple times and averaging, the effects of random noise, such as read head noise and electronic noise, are reduced. The read channel state includes "soft information", which is the probabilities of the bit values, and the best guess of the bit values, of the decoded bit pattern. More generally, the read channel state includes soft information about symbol values or Viterbi state values, as is appropriate for the particular read channel implementation.

Figure 4A:
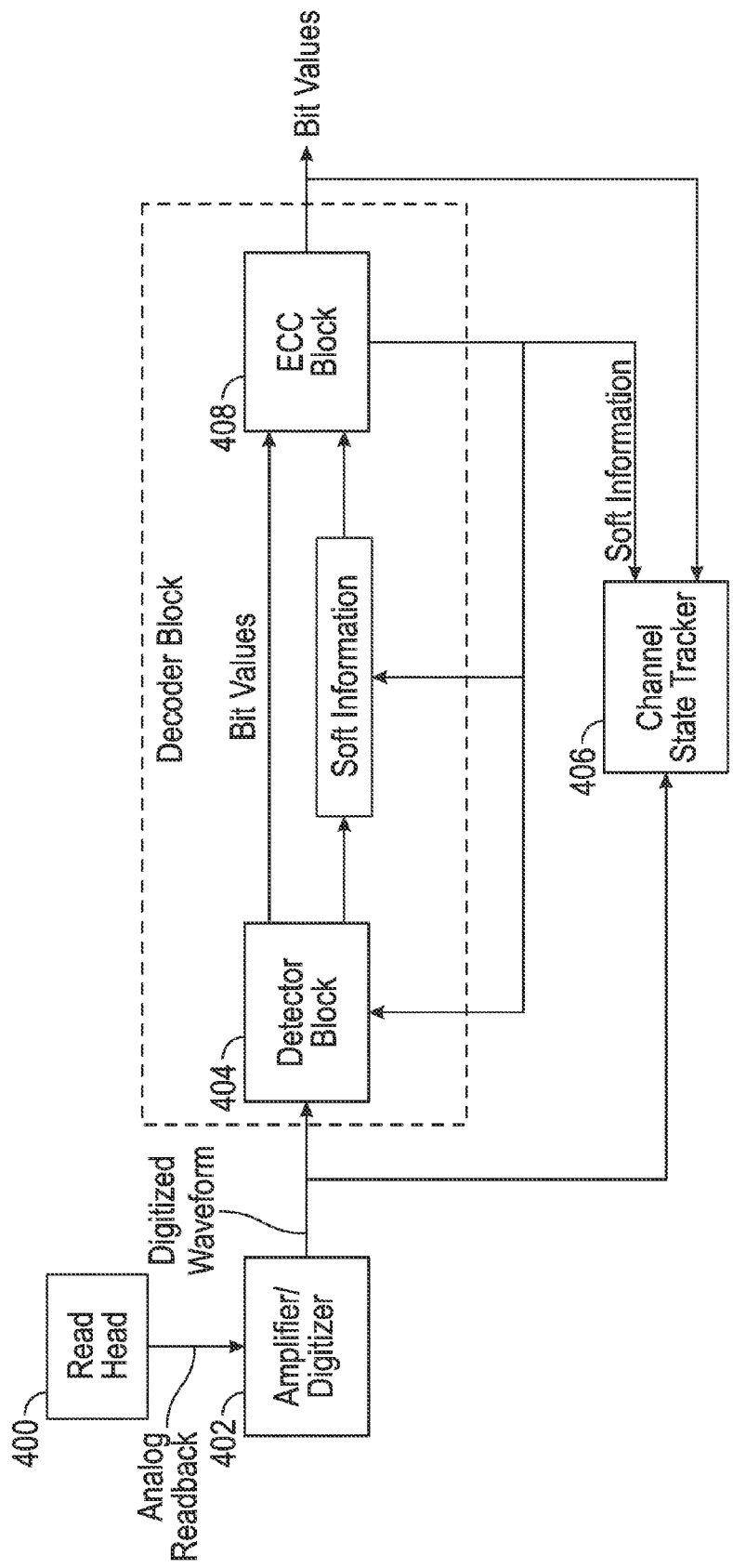
FIG. 4A is a block diagram of a portion of the disk drive read channel illustrating the channel state tracker.
Figures 4B, 5:
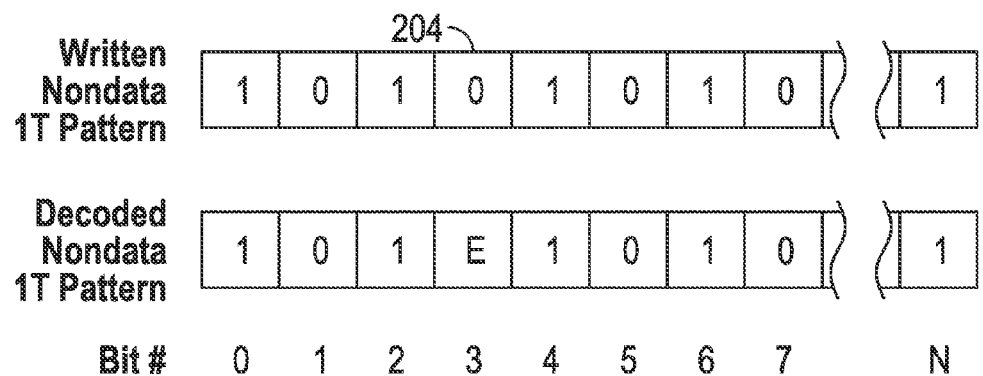
FIG. 4B is a portion of a table of the output of the detector block for three bits.
FIG. 5 shows an example of a nondata pattern that is intended to be written to the failed sector and the decoded pattern when it is read back showing an unreliable bit.

FIG. 4A is a block diagram of a portion of the disk drive read channel to better illustrate the operation in block 305 of FIG. 3. The read head 400 detects the data pattern in the sector as an analog readback signal. The analog signal from the read head is amplified and digitized at amplifier/digitizer 402. The digitized waveform is sent to detector block 404 and buffer memory, identified as channel state tracker 406. The detector block 404 generates soft information about the bit values and the best guess bit values which are sent to ECC block 408. FIG. 4B is a portion of a table of the output of detector block 404 for three bits. The digitized waveform values (DWV), for example, can correspond to digital values between 0 and 127, where 0 is the most negative value and 127 the most positive value. The DWV can be over-sampled so that two or more values are associated with each bit. The soft information are the probabilities $P(0)$, $P(1)$, that the DWV for the bit is a 0 or 1, respectively. Likewise, the soft information may contain probabilities for the symbol containing the bit or the Viterbi state of the bit and several of its nearest neighbors. The best guess bit values are the bit values determined from the probabilities. Returning to FIG. 4A, the ECC block 408 takes the bit values, performs error correction, and generates new bit values if bit errors were corrected. The ECC sends the bit values and updated soft information to the channel state tracker 406. In some implementations, such as in low signal-to-noise ratio (SNR) environments, it may be advantageous to average the readback signal. This may be done by reading the analog read signal multiple times (with read synchronization) and averaging the digitized waveform to form an averaged DWV before attempting to detect the data.

Referring again to the flow chart of FIG. 3, the data sectors in adjacent tracks that are adjacent to the failed sector are optionally read and decoded, and also stored in the buffer (block 310). This is done if adjacent track erasure is suspected as the cause of the sector failure, or if there is concern that the recovery procedure might produce erasure on the adjacent tracks. After the failed sector channel information and adjacent track bit values have been stored, the first of a number of predetermined nondata patterns is written to the failed sector (block 315). First a 1 T tone (101010 . . . ) (alternating positive/negative or up/down magnetization) pattern is written to the failed sector. When writing the 1 T tone, the regular ECC algorithm might need to be modified or disabled if the ECC would otherwise modify the actual pattern written to the desired bits on the disk. The written region is read back, and sent to the read channel and decoded (block 320). The decoded pattern identifies the number and location of defective bits in the written nondata pattern, corresponding to the number and location of defective, and hence unreliable, data bits in the sector. Write and read synchronization is maintained during the write and read processes to allow proper correlation of the written pattern, decoded bit values, and bit locations in the original failed sector. FIG. 5 shows an example of a 1 T nondata pattern that is intended to be written to the failed sector and the decoded pattern when it is read back from the failed sector after having been written. A comparison of the readback pattern with the pattern intended to be written reveals that there is a bit error at the location of bit #3. Referring again to the flow chart of FIG. 3, if the number of errors exceeds E_max (NO at block 325) then, if all of the predetermined nondata patterns have been attempted (YES at block 330) the sector is marked as failed and the drive informs the customer of the unrecoverable error (block 340). However, if the number of written errors is below a threshold, E_max, (YES at block 325) then the identified error locations are used to update the read channel state (block 335). E_max can be chosen based on the ECC strength, or how many errors the ECC can reliably decode. For example, E_max can be chosen so that is it is a multiple between 0.5 and 2 of the maximum number of errors the ECC can reliably decode. In particular, the value of E_max should be constrained properly to keep the rate at which the sector is incorrectly decoded below an acceptable threshold.

At block 335, the original read channel state from the failed sector is recalled from the buffer and the bits at the identified error locations are marked as unreliable bits, i.e., hard bit errors due to defective data islands. For example, referring back to FIG. 4B, bit #n would be marked as unreliable if P(0) and P(1) were each computed as 0.5. Depending on the read channel decoding scheme, the marking of bits as unreliable could mean either updating the soft information in an LDPC channel or sending an error pointer to the symbols containing the error bits in a Reed-Solomon channel. At block 345 the data pattern from the failed sector is attempted to be decoded. If the decoding is successful (YES at block 350) then the sector is marked as bad (block 355) and the correctly decoded data pattern is written to a different region of the disk (block 360), for example physical sectors specifically intended for use as spare sectors. If the data in sectors in adjacent tracks that are adjacent to the failed sector were also stored in the buffer at block 310, then this data is rewritten back to the disk (block 365).

If the decoding was not successful (NO at block 350), then the method repeats, with either the same pattern or preferably with a different nondata pattern, selected at block 315. The second nondata pattern may be a 1 T pattern of opposite polarity to the first nondata 1 T pattern, which would identify stuck bits. After reading back the second and any successive nondata patterns (block 320), any new bit error locations are added to ones identified in the previous attempts. If the previous attempt yields a count larger than E_max (NO at block 325) then the failed sector is deemed unrecoverable (block 340). The new collection of bit error locations from the read-back of addition nondata patterns are passed to the read channel to attempt to decode the data pattern from the failed sector (block 350).

If the decoding continues to be unsuccessful then other nondata patterns can be tried, including ones in which the write clock phase is shifted from optimal, as listed in block 315. For example, the drive can write a 1 T pattern with the write phase shifted by, for example 5%, from the ideal write clock phase in either direction. This allows low or high coercivity data islands to be detected and identified as defective. The magnitude of the shift can be from 2-20% and incremented accordingly on successive passes and spanning both positive and negative shifts. Other possible patterns include 2 T (110110110 . . . ), 3 T (111011101110 . . . ), and other tones, pseudo-random, and random data patterns. These patterns can also be time shifted.

The method has primary application to BPM HDDs, because BPM HDDs have write synchronization to the precise physical locations of the discrete data islands. This enables the locations of defective data islands in a failed sector to be determined. Similarly, the invention applies to BPM combined with HAMR. However, the invention is also applicable to conventional continuous-media HDDs, like PMR and HAMR HDDs, provided they have write synchronization, i.e., the ability to synchronize writing to precise physical locations on the disk. In a continuous-media HDD with write and read synchronization, writing and reading is synchronized to precise regions of the data sectors, each region of continuous media representing a data bit.

The invention is also applicable to a "shingled" magnetic recording (SMR) type of magnetic recording HDD. SMR is well-known in the art, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The shingled data tracks are arranged on the disk as annular regions or bands separated by annular inter-band gaps. When data is to be re-written or updated, all of the shingled data tracks that were written after the track being updated was written are also re-written. Thus in this invention, when applied to SMR, when the corrected data pattern is written to a different sector in a band, additional data tracks in that band are also re-written.

The system and method as described above and illustrated with various block diagrams may be implemented in conventional digital or analog hardware components or in software or with a combination of hardware and software. The servo control processor, the processor in the controller electronics, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a magnetic recording disk having a recording surface with a plurality of circular data tracks containing data sectors, the data sectors containing magnetizable data regions, each data region representing a data bit;
   a write head associated with said disk surface for writing desired data patterns in the sectors by generating a magnetic write field to magnetize the data regions;
   a read head for detecting the magnetic state of the data regions in the sectors;
   a detector coupled to the read head for detecting the magnetic state of the data regions into data patterns of data bits;
   an error corrector for correcting bit errors in the detected data patterns;
   a controller for synchronizing the reading and writing of data to individual data regions; and
   memory coupled to the controller and containing a program of instructions readable by the controller for recovering data written to data sectors containing defective data regions, the program of instructions undertaking the method acts comprising:
   (a) determining that a data pattern in a sector cannot be corrected by the error corrector;
   (b) storing in memory the uncorrectable data pattern;
   (c) writing a predetermined nondata pattern to the sector containing said uncorrectable data pattern;

(d) reading said written predetermined nondata pattern;

(e) identifying the location of defective data regions in said sector that cannot be corrected by comparing the read predetermined nondata pattern with the written predetermined nondata pattern;

(f) attempting to correct, with the error corrector, said data pattern that cannot be corrected by marking bits representing the identified defective data regions as hard bit errors; and if at step (f) said data pattern can be corrected, writing the corrected data pattern to a different sector and then marking the sector for said data pattern as bad.

2. The method of claim 1 further comprising verifying that the uncorrectable data pattern stored in memory matches the uncorrectable data pattern in the sector.

3. The disk drive of claim 1 wherein the predetermined nondata pattern is a first pattern and the method acts further comprise:

if at step (e) the number of defective data regions exceeds a predetermined threshold, wherein said predetermined threshold is a multiple of the maximum number of errors that can be reliably decoded by the error corrector, repeating steps (c) through (f) with a second predetermined nondata pattern.

4. The method of claim 3 where the second predetermined nondata pattern is different from said first pattern.

5. The disk drive of claim 1 wherein the method acts further comprise:

if at step (e) the number of defective data regions exceeds a predetermined threshold, wherein said predetermined threshold is a multiple of the maximum number of errors that can be reliably decoded by the error corrector, repeating step (c) by writing said predetermined nondata pattern with a write clock phase shift.

6. The disk drive of claim 1 further comprising verifying that the corrected data is written correctly.

7. The disk drive of claim 1 wherein the method acts further comprise:

storing in memory the data patterns from sectors radially adjacent to the sector that contains the uncorrectable data pattern; and if at step (f) said data pattern can be corrected, then recalling from memory said data patterns from said radially adjacent sectors and writing said data patterns from said radially adjacent sectors back to said radially adjacent sectors.

8. The disk drive of claim 1 wherein the error corrector is a Reed-Solomon error corrector for correcting bit errors by correcting symbols containing a grouping of data bits, and wherein step (f) comprises attempting to correct, with the error corrector, said data pattern that cannot be corrected by marking symbols containing the identified defective data islands as unreliable.

9. The disk drive of claim 1 wherein the error corrector is a low-density-parity-check (LDPC) error corrector for correcting bit errors by correcting states containing a grouping of data bits, and wherein step (f) comprises attempting to correct, with the error corrector, said data pattern that cannot be corrected by marking states containing the identified defective data islands as unreliable.

10. The disk drive of claim 1 wherein the recording surface of the disk is a continuous-media magnetic recording surface.

11. The disk drive of claim 1 wherein the magnetic recording disk is a bit-patterned-media (BPM) disk and wherein the data regions are discrete data islands.

12. The disk drive of claim 1 wherein the disk drive is a heat-assisted magnetic recording (HAMR) disk drive.

13. The disk drive of claim 1 wherein the disk drive is a shingled magnetic recording (SMR) disk drive.

14. A bit-patterned-media (BPM) magnetic recording disk drive comprising:

a magnetic recording disk having a recording surface with a plurality of circular data tracks containing data sectors, the data sectors containing discrete magnetizable data islands;

a write head associated with said disk surface for writing desired data patterns in the sectors by generating a magnetic write field to magnetize the data islands;

a read head for detecting the magnetic state of the data islands in the sectors;

a detector coupled to the read head for detecting the magnetic state of the data islands into data patterns of data bits;

an error corrector for correcting bit errors in the detected data patterns;

a controller for synchronizing the reading and writing of data to individual data islands; and memory coupled to the controller and containing a program of instructions readable by the controller for recovering data written to data sectors containing defective data islands, the program of instructions undertaking the method acts comprising:

(a) determining that a data pattern in a sector cannot be corrected by the error corrector;

(b) storing in memory the uncorrectable data pattern;

(c) writing a predetermined nondata pattern to the sector containing said uncorrectable data pattern;

(d) reading said written predetermined nondata pattern;

(e) identifying the location of defective data islands in said sector that cannot be corrected by comparing the read predetermined nondata pattern with the written predetermined nondata pattern; and (f) attempting to correct, with the error corrector, said data pattern that cannot be corrected by marking bits representing the identified defective data islands as hard bit errors; and if at step (e) the number of defective data islands exceeds a predetermined threshold, wherein said predetermined threshold is a multiple of the maximum number of errors that can be reliably decoded by the error corrector, repeating step (c) by one of writing said predetermined nondata pattern with a write clock phase shift and writing a second predetermined pattern different from said first pattern, and then repeating steps (d) through (f).

15. The disk drive of claim 14 wherein the method acts further comprise:

if at step (f) said data pattern can be corrected, then marking the sector for said data pattern as bad, and writing the corrected data pattern to a different sector.

16. The disk drive of claim 15 wherein the method acts further comprise:

storing in memory the data patterns from sectors radially adjacent to the sector that contains the uncorrectable data pattern; and if at step (f) said data pattern can be corrected, then recalling from memory said data patterns from said radially adjacent sectors and writing said data patterns from said radially adjacent sectors back to said radially adjacent sectors.

\* \* \* \* \*